United States Patent [19]

Onda et al.

[11] 4,292,550
[45] Sep. 29, 1981

[54] GATE CONTROL CIRCUIT WITH CAPACITOR FOR FIELD CONTROLLED THYRISTOR

[75] Inventors: Kenichi Onda; Norikazu Tokunaga, both of Hitachi, Japan

[73] Assignee: Hitachi, Ltd., Tokyo, Japan

[21] Appl. No.: 15,475

[22] Filed: Feb. 26, 1979

[30] Foreign Application Priority Data

Feb. 24, 1978 [JP] Japan ................ 53-19660

[51] Int. Cl.³ ............................................. H03K 17/60
[52] U.S. Cl. ........................ 307/252 A; 307/252 C; 307/252 J; 307/252 K; 307/305; 357/38
[58] Field of Search ................ 357/22, 58, 38; 307/252 A, 252 C, 252 J, 252 K, 305

[56] References Cited

U.S. PATENT DOCUMENTS

| | | | |
|---|---|---|---|
| 3,617,773 | 11/1971 | Eccles | 307/252 C |
| 3,694,669 | 9/1972 | Witt et al. | 307/252 K |
| 4,037,245 | 7/1977 | Ferro | 357/38 |
| 4,060,821 | 11/1977 | Houston et al. | 357/38 |
| 4,162,413 | 7/1979 | Akamatsu | 307/252 J |

FOREIGN PATENT DOCUMENTS 2323258  11/1973  Fed. Rep. of Germany ... 307/252 J
44-17224  7/1969  Japan ............................ 307/252 C

*Primary Examiner*—Joseph E. Clawson, Jr.
*Attorney, Agent, or Firm*—Craig and Antonelli

[57] ABSTRACT

The positive terminal of a series circuit consisting of two capacitors is connected with the cathode of a field controlled thyristor through a resistor and a transistor and the negative terminal thereof is connected with the gate of the field controlled thyristor. The junction of the series circuit is connected with the cathode of the field controlled thyristor through a thyristor. Each capacitor is charge by d.c. current. When the field controlled thyristor is intended to be turned off, the thyristor and the transistor are first made conductive and then the one capacitor is discharged through the thyristor. As a result, the field controlled thyristor is turned off. After the turn-off of the field controlled thyristor, the voltage of the other capacitor is applied to the gate of the field controlled thyristor to hold it in the blocking state.

7 Claims, 4 Drawing Figures

GATE CONTROL CIRCUIT WITH CAPACITOR FOR FIELD CONTROLLED THYRISTOR

BACKGROUND OF THE INVENTION

This invention relates to a gate control circuit for a field controlled thyristor in which the current flowing from an anode to a cathode is controlled by the gate-cathode voltage.

The field controlled thyristor (hereafter referred to simply as FCT) is turned on and brought into the "conducting state" when a negative bias voltage lower than a preset voltage is applied to its gate. In the "conducting state," current flows from the anode to the cathode since the resistance distributed through the anode-cathode path is low. On the contrary, if the negative bias voltage is set higher than the preset voltage, the FCT is turned off to be brought into the "blocking state." In the "blocking state," the current flowing from anode to cathode is substantially blocked.

The above mentioned preset voltage is usually called the "pinch-off voltage" and varies depending on the bias voltage applied between the anode and the cathode of the FCT.

Such a semiconductor device as described above is well-known and disclosed in, for example, U.S. Pat. Nos. 4,037,245 to Armand P. Ferro and 4,060,821 to Douglas E. Houston et al.

The FCTs disclosed in those cited documents have a feature that the current which flows from the anode to the cathode can be controlled by the voltage applied between the gate and the cathode which voltage is set lower than the voltage applied between the anode and the cathode. They also have a feature that when they are turned from the conducting state to the blocking state, a current substantially equal to the current flowing in the conducting state from the anode to the cathode flows through the gate-cathode path, and a feature that a negative bias voltage higher than the pinch-off voltage must continue to be applied to the gate so as to hold the FCT in the blocking state.

In a gate control circuit for an ordinary thyristor or a gate turn-off thyristor, a capacitor is previously charged by a dc power source and then discharged at the time of firing or extinguishing the thyristor. The voltage across the thus discharged capacitor becomes much lower than the voltage across the capacitor developed before the discharge (hereafter referred to for brevity as the initial charge voltage). However, the thyristor need not be supplied with a gate bias voltage once it has been turned on or off. It is therefore not necessary to take the voltage across the capacitor after the discharge thereof into consideration. Accordingly, the capacitance of the capacitor is so selected as to be large only enough for turning on or off the thyristor. In case of applying a gate control circuit using the discharge of a capacitor to an FCT, the voltage across the capacitor must be kept higher than the pinch-off voltage even after the turn-off of the FCT. For, as described above, a negative bias voltage higher than the pinch-off voltage must continue to be applied to the gate so as to hold the FCT in its blocking state.

To maintain the voltage across the capacitor high enough, it is necessary to make the capacitance of the capacitor large or the initial charge voltage high. These measures, however, result in the increase in the size of the capacitor. In general, the physical size of a capacitor is proportional to the electrostatic energy E it can store. The electrostatic energy E is expressed by the following formula:

$$E = \tfrac{1}{2} C V_m^2,$$

where C is the electrostatic capacitance of the capacitor and Vm the maximum working voltage. It is customary to set the maximum working voltage Vm higher than the initial charge voltage.

A capacitor having a large capacitance and a high working voltage will occupy a rather small space in the gate control circuit assembly if the allowable current of the capacitor is small. However, a capacitor used to turn off an FCT has a large allowable current and occupies a relatively large space in the gate control circuit assembly. It is therefore not preferable to allow the capacitor to have a large capacitance and/or a high working voltage.

SUMMARY OF THE INVENTION

One object of this invention is to provide a gate control circuit which does not need a capacitor having a large allowable current, a large capacitor and a high working voltage.

Another object of this invention is to provide a gate control circuit in which the capacitor connected with the FCT to turn it off or to hold it in the blocking state is automatically disconnected from them after they have been turned off.

According to this invention, there is provided a gate control circuit for an FCT wherein the capacitance of the capacitor connected between the gate and the cathode of the FCT to turn the FCT off and to hold the FCT in the blocking state is so set as to be large enough only for turning the FCT off and wherein after the FCT has been turned to the blocking state by the discharge of the capacitor, a voltage source whose voltage is higher than the pinch-off voltage is connected with the gate and the cathode of the FCT in the blocking state in place of the capacitor.

DESCRIPTION OF THE PREFERRED EMBODIMENT

Figure 1:
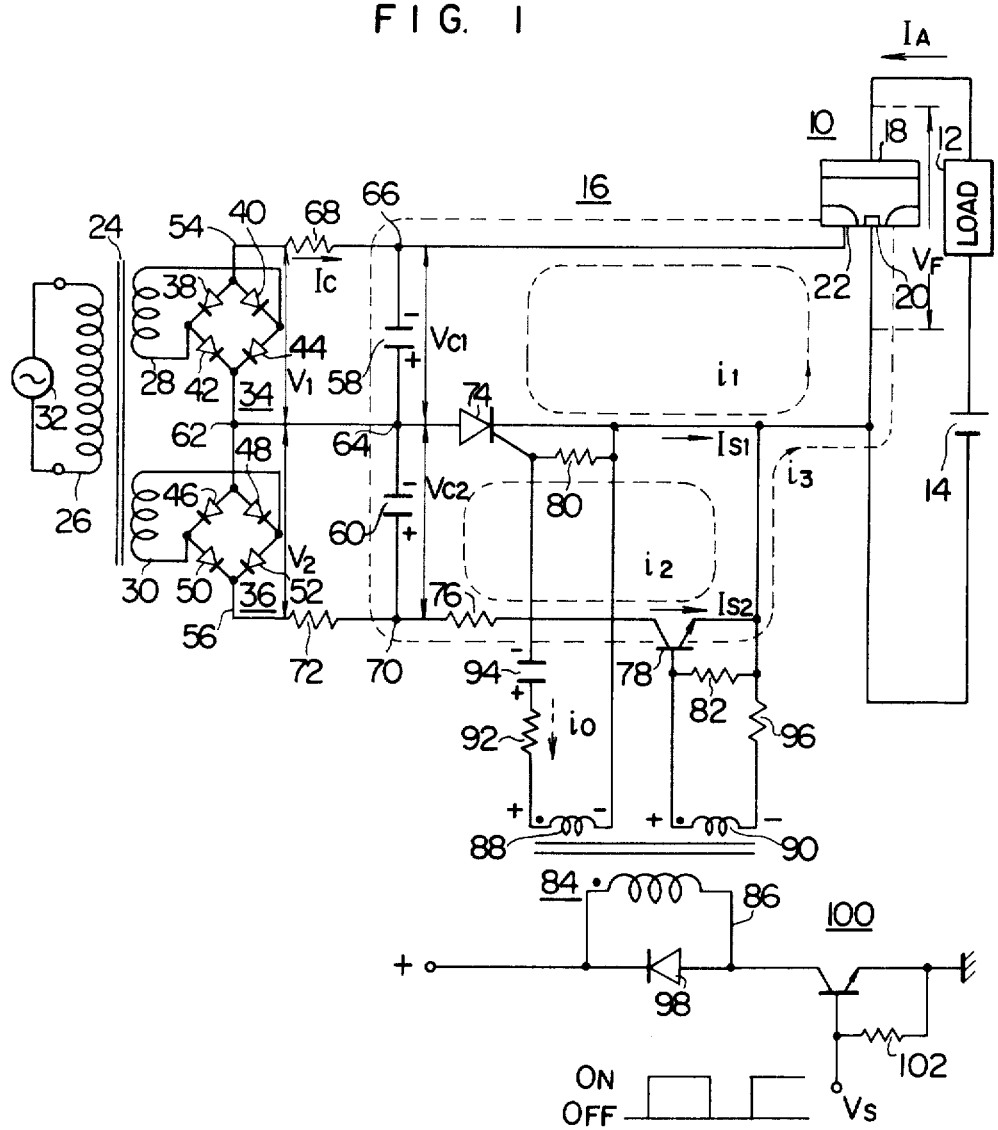
FIG. 1 shows a gate control circuit as an embodiment of this invention.

In FIG. 1, an FCT 10, connected in series with a main circuit comprising a load 12 and a dc power source 14 connected in series, is so controlled by a gate control circuit 16 as to be brought into the conducting state or the blocking state. The FCT 10 has an anode 18, a cathode 20 and a gate 22 and while a bias voltage higher than the pinch-off voltage $V_p$ is being applied between the cathode 20 and the gate 22, current is prevented from flowing from the anode 18 to the cathode 20. This bias voltage is a negative one to keep the potential of the gate 22 lower than that of the cathode 20. When the negative bias voltage is lower than the pinch-off voltage $V_p$, current flows from the anode 18 to the cathode 20 so that the output voltage of the dc power source 14 is applied to the load 12.

A power transformer 24 in the gate control circuit 16 has a primary winding 26 and two secondary windings 28 and 30. The primary winding 26 is connected with the commercial source 32. The secondary windings 28 and 30 are connected respectively with full-wave rectifier circuits 34 and 36. The full-wave rectifier 34 consists of four diodes 38, 40, 42 and 44 and the full-wave rectifier 36 of four diodes 46, 48, 50 and 52. The full-wave rectifiers 34 and 36 are so connected in series with each other that the output voltages $V_1$ and $V_2$ of them may be additively superposed on each other. Two capacitors 58 and 60 are connected in series between the negative terminal 54 of the full-wave rectifier 34 and the positive terminal 56 of the full-wave rectifier 36. The junction point 64 of the capacitors 58 and 60 is connected with the junction point 62 of the two full-wave rectifiers 34 and 36. The negative terminal 66 of the capacitor 58 is connected through a resistor 68 with the rectifier 34 and the positive terminal 70 of the capacitor 60 is connected through a resistor 72 with the rectifier 36, so that the capacitors 58 and 60 are charged through the resistors 68 and 72, respectively. The output voltage $V_1$ of the full-wave rectifier 34 is selected to be lower than the pinch-off voltage $V_p$ while the output voltage $V_2$ of the full-wave rectifier 36 is set higher than the pinch-off voltage $V_p$. The capacitance of the capacitor 58 is so chosen as to be enough only for turning the FCT 10 off. The initial charge voltage of the capacitor 58 is set lower than the pinch-off voltage $V_p$. The maximum working voltage Vm of the capacitor 58 is therefore chosen to be lower than $V_p$. The voltage across the capacitor 60 is also set higher than $V_p$.

The gate 22 of the FCT 10 is connected with the negative terminal 66 and the cathode 20 of the FCT 10 is connected with the junction point 64 through a thyristor 74 and also with the positive terminal 70 through a resistor 76 and a transistor 78. The resistance of the resistor 76 is high enough to prevent the voltage across the capacitor 60 from dropping below the pinch-off voltage $V_p$.

A bias resistor 80 is connected between the gate and the cathode of the thyristor 74 and a bias resistor 82 is connected between the base and the emitter of the transistor 78. A pulse transformer 84 is so provided as to control the thyristor 74 and the transistor 78. The pulse transformer 84 has an input winding 86 and a pair of output windings 88 and 90. The output winding 88 is connected with both the ends of the bias resistor 80 through a resistor 92 and a capacitor 94. The output winding 90 is connected with both the ends of the bias resistor 82 through a resistor 96. The input winding 86 of the transformer 84 is connected in inverse parallel configuration with a diode 98. The diode 98 is provided to prevent an abnormal voltage from being induced across the input winding 86. A transistor 100 is connected in series with the input winding 86 and a bias resistor 102 is connected between the base and the emitter of the transistor 100. The transistor 100 and the bias resistor 102 constitute a control signal generator for controlling the thyristor 74 and the transistor 78. The transistor 100 is conductive when the control signal $V_s$ is at the ON level so that current flows through the input winding 86, while the transistor 100 is cut off when the control signal $V_s$ is at the OFF level.

Figure 2A:
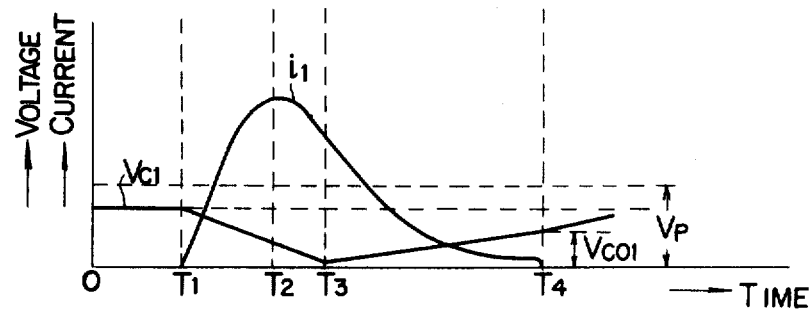
FIGS. 2A, 2B and 2C show waveforms useful in explaining the operation of the gate control circuit shown in FIG. 1, $V_{c1}$ and $V_{c2}$ being the voltages across the capacitors connected with the gate of an FCT, $i_1$ and $i_3$ the discharge currents from the capacitors, $i_2$ the circulating current, $I_A$ the anode-cathode current of the FCT and $V_F$ the anode-cathode voltage of the FCT.
Figure 2B:
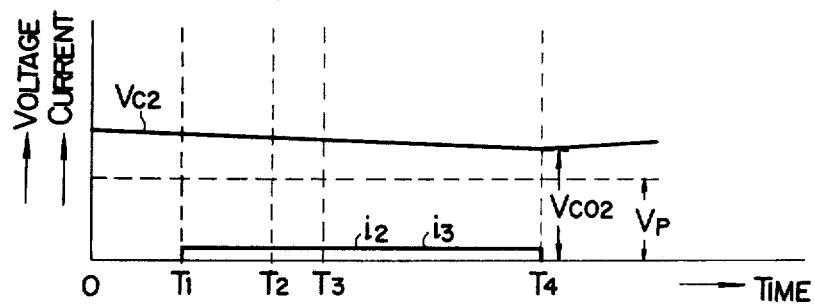

Now, let it be assumed that the control signal $V_s$ supplied to the base of the transistor 100 is at the OFF level. Then, the transistor 100 is held in the cut-off state so that no output appear at the output windings 88 and 90 of the pulse transformer 84 and that both the thyristor 74 and the transistor 78 remain cut-off. Accordingly, no negative bias voltage is applied between the gate 22 and the cathode 20 of the FCT 10 and therefore the FCT 10 is kept in the conducting state. The capacitor 58 is then charged by the rectifier circuit 34, having a polarity as shown in FIG. 1 and the voltage $V_{c1}$ across the capacitor 58 is lower than the pinch-off voltage $V_p$, as shown in FIG. 2A. However, the capacitor 58 stores in it an amount of charges enough to turn the FCT 10 from the conducting state to the blocking state. On the other hand, the capacitor 60 is charged by the rectifier circuit 36, having a polarity as shown in FIG. 1. The voltage $V_{c2}$ across the capacitor 60 is higher than the pinch-off voltage $V_p$, as shown in FIG. 2B.

When the control signal $V_s$ applied to the transistor 102 takes the ON level at a time $T_1$, current flows through the input winding 86 of the pulse transformer 84. As a result, voltages having such polarities as shown in FIG. 1 are induced across the output windings 88 and 90. The output voltage developed across the output winding 88 is applied through a resistor 92 and a capacitor 94 to the bias resistor 80 so that the thyristor 74 is fired. On the other hand, the output voltage developed across the output winding 90 is applied through a resistor 96 to the bias resistor 82 so that the transistor 78 is rendered conductive.

When the thyristor 74 and the transistor 78 are both turned conductive, three kinds of current $i_1$, $i_2$ and $i_3$ flow through the gate control circuit 16, as shown in FIG. 1. The current $i_1$ is the discharge current flowing through the path: capacitor 58—thyristor 74—cathode 20—gate 22—capacitor 58. The current $i_2$ is the circulating current flowing through the path: capacitor 60—resistor 76—transistor 78—thyristor 74—capacitor 60. And the current $i_3$ is the discharge current flowing through the path: capacitor 60—resistor 76—transistor 78—cathode 20—gate 22—capacitor 58—capacitor 60.

Figure 2C:
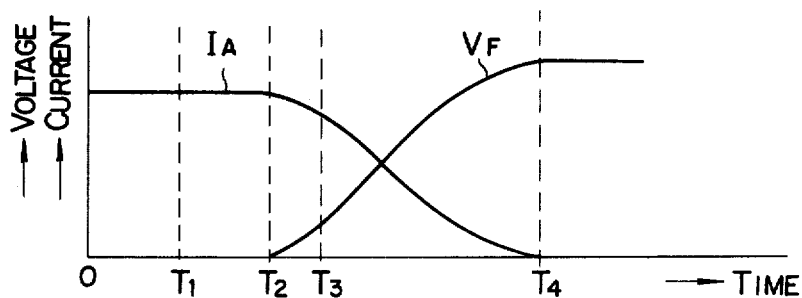

Since the impedance of the path through which the current $i_1$ flows is low, the current $i_1$ rises at the time $T_1$ and reaches its peak value at a time $T_2$, as shown in FIG. 2A. The peak value is nearly equal to the current $I_A$ flowing from the anode to the cathode of the FCT 10. In the transience of the FCT 10 from the conducting state to the blocking state, the discharge voltage $i_1$ gradually decreases until it vanishes at a time $T_4$. The load current $I_A$ through the FCT 10 decreases after the time $T_2$ at which the FCT 10 enters into the transience to the blocking state, until it substantially vanishes at the time $T_4$, as shown in FIG. 2C. The voltage $V_E$ between the anode and the cathode of the FCT 10 begins to increase at the time $T_2$ and reaches its peak value at the time $T_4$.

The current $I_{s1}$ flowing through the thyristor 74 is the difference $i_1-i_2$ between the discharge current $i_1$ from the capacitor 58 and the circulating current $i_2$. When the current $I_{s1}$ becomes smaller than the current for holding the thyristor 74 on, the thyristor 74 is automatically cut off. Therefore, no special circuit for extinguishing the thyristor 74 is needed. When the thyristor 74 is cut off, the currents $i_1$ and $i_2$ both vanish.

The voltage across the capacitor 58 falls after the time $T_1$ at which the thyristor 74 is turned on, as the capacitor continues to be discharged, as shown in FIG. 2A. The voltage becomes the minimum at the time $T_3$ at which the charging current $I_c$ becomes equal to the discharge current $i_1$, and increases again after the time $T_3$. The voltage $V_{co1}$ developed across the capacitor 58 at the time $T_4$ at which the FCT 10 is turned to the blocking state, is lower than the pinch-off voltage $V_p$, as shown in FIG. 2A. Accordingly, it is impossible to cause the capacitor 58 to hold the FCT 10 in the blocking state after the time $T_4$. Since the discharge current $i_2$ is limited by the resistor 76 as shown in FIG. 2B, the voltage $V_{c2}$ across the capacitor 60 has a value $V_{co2}$ larger than the pinch-off voltage $V_p$ even at the time $T_4$. The transistor 78 continues to be conductive while the output winding 90 is delivering an output. As a result a negative bias voltage higher than the pinch-off voltage $V_p$ is applied to the FCT 10 even after the time $T_4$ by means of the combined function of the transistor 78 and the capacitor 60. Accordingly, the FCT 10 continues to be held in the blocking state.

Next, when the control signal $V_s$ applied to the gate of the transistor 100 takes the OFF level, the transistor 100 is cut off. As a result, the outputs across the output windings 88 and 90 of the pulse transformer 84 vanish. Accordingly, the transistor 78 is also cut off to cause the negative bias voltage being applied to the gate 22 of the FCT 10 to be removed, so that the FCT 10 resumes the conductive state.

While there is no output delivered by the output winding 88, the capacitor 94 causes the discharge current $i_o$ to flow in the direction indicated by an arrow of dashed line in FIG. 1 so that a negative bias voltage is supplied to the thyristor 74. This prevents the thyristor 74 from being erroneously fired.

As described above, according to the embodiment of this invention, the FCT 10 is turned from the conducting state to the blocking state by the discharge current from the capacitor 58 and thereafter the FCT 10 is held in the blocking state by the discharge current from the capacitor 60. Therefore, the capacitor 58 has only to store an amount of charges enough to turn the FCT 10 off, and the initial charge voltage and the voltage after the discharge may be set lower than the pinch-off voltage $V_p$. This allows the capacitor to have a relatively small capacity and a comparatively low maximum working voltage. Since little current flows into the capacitor 60, a small-sized capacitor having a small allowable current can be used as the capacitor 60 even though the charging voltage is high.

We claim:

1. A gate control circuit for providing a gate control bias signal to a field controlled thyristor having an anode and a cathode coupled, respectively, to positive and negative terminals of a voltage source, and a gate coupled to said gate control circuit, wherein a current generated from said voltage source will flow from said anode to said cathode when said gate control circuit biases said field controlled thyristor with a gate-to-cathode negative bias voltage lower than a pinch-off voltage of the field controlled thyristor and wherein said current flow will be blocked when a gate-to-cathode negative bias voltage higher than the pinch-off voltage is applied to the field controlled thyristor by said gate control circuit, comprising:

a first d.c. source having a first positive terminal and a first negative terminal;

a capacitor having a second positive terminal connected to both the first positive terminal and the cathode of the field controlled thyristor, and having a second negative terminal connected to both the first negative terminal and the gate of the field controlled thyristor, the capacitance of said capacitor being so selected as to be large enough to store sufficient charge from said first d.c. source to turn off the field controlled thyristor;

first switching means connected between the second positive terminal of said capacitor and the cathode of the field controlled thyristor so that said capacitor will discharge to provide negative voltage between the gate and cathode of the field controlled transistor to turn it off when the first switching means is closed;

a second d.c. source having a third positive terminal and a third negative terminal, and having an output voltage higher than the pinch-off voltage, the third positive terminal and the third negative terminal being respectively coupled to the cathode and the gate of the field controlled thyristor; and second switching means connected between the third positive terminal of said second d.c. source and the cathode of the field controlled thyristor, so that said second d.c. source will be coupled between the gate and cathode of the field controlled thyristor to hold it in its off state after turn-off when the second switching means is closed.

2. A gate control circuit for a field controlled thyristor as claimed in claim 1, wherein said first switching means is a thyristor, and said second switching means is a transistor.

3. A gate control circuit for providing a gate control bias signal to a field controlled thyristor having an anode and a cathode coupled, respectively, to positive and negative terminals of a voltage source, and a gate coupled to said gate control circuit, wherein a current generated from said voltage source will flow from said anode to said cathode when said gate control circuit biases said field controlled thyristor with a gate-to-cathode negative bias voltage lower than a pinch-off voltage of the field controlled thyristor and wherein said current flow will be blocked when a gate-to-cathode negative bias voltage higher than a pinch-off voltage is applied to the field controlled thyristor by said gate control circuit, comprising:

a series circuit of first and second capacitors, said series circuit having a positive terminal and a junction between the first and second capacitors both respectively coupled to the cathode of the field controlled thyristor, and said series circuit having a negative terminal coupled to a gate of the field controlled thyristor, a capacitance of the first capacitor to which the negative terminal of said series circuit is connected being so selected as to be large enough to store a sufficient charge to turn off the field controlled thyristor;

a first d.c. source having a positive output terminal and a negative output terminal respectively connected to a junction of said series circuit and the negative terminal thereof to charge said first capacitor;

a second d.c. source having a positive output terminal and a negative output terminal respectively connected to the positive terminal of said series circuit and the junction thereof, said second d.c. source having an output voltage higher than said pinch-off voltage;

a thyristor connected between the junction of said series circuit and the cathode of the field controlled thyristor so that said first capacitor will discharge to provide negative voltage between the gate and cathode of the field controlled thyristor to turn it off when the thyristor is in its conducting state;

a transistor connected between the positive terminal of said series circuit and the cathode of the field controlled thyristor so that said second d.c. source will be coupled between the gate and cathode of the field controlled thyristor to hold it in its off state after turn-off when said transistor is in its conducting state;

a resistor connected in series with said transistor, the resistance of said resistor being so selected as to be large enough to prevent the voltage across the second capacitor from dropping below the pinch-off voltage; and means coupled to said thyristor and said transistor for controlling the state of conduction thereof.

4. A gate control circuit for a field controlled thyristor as claimed in claim 3, wherein a maximum working voltage of the first capacitor is so selected as to be lower than the pinch-off voltage.

5. A gate control circuit for providing a gate control bias signal to a field controlled thyristor having an anode and a cathode coupled, respectively, to positive and negative terminals of a voltage source, and a gate coupled to said gate control circuit, wherein a current generated from said voltage source will flow from said anode to said cathode when said gate control circuit biases said field controlled thyristor with a gate-to-cathode negative bias voltage lower than a pinch-off voltage of the field controlled thyristor and wherein said current flow will be blocked when a gate-to-cathode negative bias voltage higher than the pinch-off voltage is applied to the field controlled thyristor by said gate control circuit, comprising:

a series circuit of first and second capacitors, said series circuit having a positive terminal and a junction between the first and second capacitors both coupled to the cathode of the field controlled thryistor, and said series circuit having a negative terminal coupled to the gate of the field controlled thyristor, a capacitance of the first capacitor to which the negative terminal of said series circuit is connected being so selected as to be large enough to store a sufficient charge to turn off the field control thyristor;

a first rectifier circuit having a positive output terminal and a negative output terminal respectively connected to a junction of said series circuit and the negative terminal thereof;

a first a.c. source coupled to an input of said first rectifier circuit wherein said first rectifier circuit rectifies an a.c. voltage from said first a.c. source to provide a first d.c. output voltage across the positive and negative terminals of the first rectifier to charge the first capacitor;

a second rectifier circuit having a positive output terminal and a negative output terminal respectively connected to the positive terminal of said series circuit and the junction thereof;

a second a.c. source coupled to an input of said second rectifier circuit wherein said second rectifier circuit rectifies an a.c. voltage from said second a.c. source to provide a second d.c. voltage, higher than the pinch-off voltage of the field controlled thyristor, across the positive and negative terminals of the second rectifier;

a thyristor connected between the junction of said series circuit and the cathode of the field controlled thyristor so that said first capacitor will discharge to provide negative voltage between the gate and cathode of the field controlled thyristor to turn it off when the thyristor is in its conducting state;

a transistor connected between the positive terminal of said series circuit and the cathode of the field controlled thyristor so that said second d.c. source will be coupled between the gate and cathode of the field controlled thyristor to hold it in its off state after turn-off when said transistor is in its conducting state;

a resistor connected in series with said transistor, the resistance of said resistor being so selected as to be large enough to prevent the voltage across the second capacitor from dropping below the pinch-off voltage;

a pulse transformer having an input winding and a pair of output windings, its one output winding being coupled between the gate of said thyristor and the cathode thereof and its other output winding being coupled between the base and the emitter of the transistor; and a control signal producer having a pair of output terminals, the pair of output terminals thereof being connected to the input winding of said pulse transformer.

6. A gate control circuit for a field controlled thyristor as claimed in claim 1, wherein the capacitance of the capacitor is selected to be only large enough to store an amount of charge sufficient to turn off the field controlled thyristor.

7. A gate control circuit for a field controlled thyristor as claimed in claim 1, wherein the capacitance of the first capacitor is selected to be only large enough to store an amount of charge sufficient to turn off the field controlled thyristor.

* * * * *